(12) United States Patent
Hain (10) Patent No.: US 9,999,322 B2
(45) Date of Patent: Jun. 19, 2018

(54) MODULAR SUSPENDABLE ORGANIZATIONAL APPARATUS

(71) Applicant: RBR Innovations, LLC, Harker Heights, TX (US)

(72) Inventor: Brenda L Hain, Harker Heights, TX (US)

(73) Assignee: RBR Innovations, LLC, Harker Heights, TX (US)

( * ) Notice: Subject to any disclaimer, the term of this patent is extended or adjusted under 35 U.S.C. 154(b) by 0 days. days.

(21) Appl. No.: 14/738,849

(22) Filed: Jun. 13, 2015

(65) Prior Publication Data

US 2016/0360933 A1  Dec. 15, 2016

(51) Int. Cl.
*A47K 3/28* (2006.01)
*F16B 7/04* (2006.01)
*A47B 55/02* (2006.01)

(52) U.S. Cl.
CPC .............. *A47K 3/281* (2013.01); *A47B 55/02* (2013.01); *F16B 7/0413* (2013.01)

(58) Field of Classification Search
CPC ....... A47K 3/281; A47B 47/00; F16B 7/0406; F16B 7/0426; F16B 7/0413; F16B 7/042; F16L 37/025; F16L 37/05; F16L 47/00; F16L 47/20; F16L 47/065
USPC ....... 211/85.29, 119.009; 403/297, 298, 293, 403/363, 377, 375, 383
See application file for complete search history.

(56) References Cited

U.S. PATENT DOCUMENTS

| | | | | |
|---|---|---|---|---|
| 2,827,254 A | * | 3/1958 | Faber | A47B 96/1458 248/159 |
| 3,182,345 A | * | 5/1965 | Smith | A61C 17/32 15/176.6 |
| 3,784,235 A | * | 1/1974 | Kessler | B29C 65/5057 156/294 |
| 4,573,591 A | * | 3/1986 | Chap | A47K 3/281 211/113 |
| 4,647,241 A | * | 3/1987 | Weber | F16B 7/0426 403/18 |
| 4,706,367 A | * | 11/1987 | Garringer | E04F 11/1817 29/453 |
| 4,779,902 A | * | 10/1988 | Lee | F16L 47/00 285/260 |
| 4,875,714 A | * | 10/1989 | Lee | F16L 47/00 285/260 |
| 5,255,401 A | * | 10/1993 | Sambrookes | A47K 3/281 206/77.1 |
| D382,750 S | * | 8/1997 | Andrus | D6/525 |
| D392,484 S | * | 3/1998 | Yemini | D6/525 |
| D404,948 S | * | 2/1999 | Yemini | D6/525 |
| D413,467 S | * | 9/1999 | Patel | D6/525 |
| 5,988,409 A | * | 11/1999 | Gusdorf | A47B 57/425 211/90.01 |
| D417,990 S | * | 12/1999 | Yemini | D6/525 |

(Continued)

*Primary Examiner* — Stanton L Krycinski
(74) *Attorney, Agent, or Firm* — Terry M. Sanks, Esq.; Beusse Wolter Sanks & Maire, PLLC (57) ABSTRACT

Modular suspendable organizational apparatus comprising at least one receptacle element are disclosed. In an aspect, organizational apparatus are provided that include at least one modular component that facilitates adjustment of the size of an apparatus's frame and/or adjustment, addition, and/or removal of the at least one receptacle element associated with the apparatus.

6 Claims, 11 Drawing Sheets

(56) References Cited

U.S. PATENT DOCUMENTS

| | | | | |
|---|---|---|---|---|
| 6,089,387 A * | 7/2000 | Varfolomeeva | A47B 57/06 | 211/106 |
| 6,520,351 B1 * | 2/2003 | Zadro | A47K 3/281 | 211/106 |
| D494,793 S * | 8/2004 | Winkleman | A47K 3/281 | D6/525 |
| D494,794 S * | 8/2004 | Winkleman | A47K 3/281 | D6/525 |
| 7,249,789 B2 * | 7/2007 | Haney | E21B 17/046 | 138/109 |
| D632,515 S * | 2/2011 | Cittadino | A47K 3/281 | D6/525 |
| 7,931,160 B2 * | 4/2011 | Newbouild | A47B 57/08 | 211/119.009 |
| D676,696 S * | 2/2013 | Primeau | | D6/525 |
| 8,573,416 B2 * | 11/2013 | Didehvar | A47B 45/00 | 211/119.009 |
| 8,769,781 B2 * | 7/2014 | Carney | A47K 3/281 | 24/457 |
| 2007/0045208 A1 * | 3/2007 | Quan | A47K 3/281 | 211/119 |
| 2008/0169254 A1 * | 7/2008 | Govrik | A47K 3/281 | 211/103 |

* cited by examiner

MODULAR SUSPENDABLE ORGANIZATIONAL APPARATUS

FIELD OF THE DISCLOSURE

The present disclosure generally relates to organizational apparatus, and more particularly to organizational apparatus that are adjustable via the addition and/or removal of at least one modular component, such as a frame extension segment or receptacle element, such as a shelf or hook.

BACKGROUND

The statements in this section merely provide background information related to the present disclosure and may not constitute prior art.

Various apparatus, devices, and systems have been developed in order to assist in personal and business organization for centuries. Many popular organizational apparatus include at least one receptacle element such as a shelf and/or hook. Shelving and hooks are useful for a wide range of items, such as books, magazines, fine china, toys, pictures, decorations, foodstuffs, and tools. Organizational systems utilizing shelving and/or hooks have even found significant application in the bathrooms of people's homes, such as in the form of the popular "shower caddy."

A typical shower caddy is configured to hang from a showerhead pipe and comprises a mostly rigid frame, usually integrated with at least one shelf useful for receiving one or more soaps, body washes, shampoos, and the like. Many shower caddies also include one or more hooks for hanging frequently used personal care items including washcloths, loofahs, poufs, sponges, and razors.

Some difficulties with currently available shower caddies arise when trying to accommodate the ever-increasing amount of personal care products on the market. New soaps, body washes, shampoos, conditioners, shaving creams, lotions, and similar products are continuously being introduced for sale, all with their own shapes and sizes of containers. Users may find themselves frustrated when a particular shower caddy is too small to fit all of their products, forcing products that don't fit to be placed in potentially dangerous locations, such as the shower floor, or is too big and wastes valuable space. Space issues are further compounded in situations wherein multiple users share a shower caddy. Additionally, a user may purchase one type of shower caddy at one time, and be forced to purchase a more appropriate shower caddy later if the user's circumstances change, such as obtaining more or fewer roommates, requiring more or fewer personal care products, etc.

In response to user frustrations, some shower caddies have been created that comprise one or more shelves that are movable. Such shelves may be rotatable, slidable, addable, and/or removable in an effort to configure them in such a way so as to accommodate various amounts of products of various sizes. However, the size of the frames of these caddies remains fixed, thereby substantially limiting how much the shelves may be adjusted.

Currently available shower caddies are a source of further annoyance when they break. A broken shower caddy requires a user to purchase a brand new caddy, even if only a small portion of the caddy is broken. This creates a significant amount of material and financial waste that many users would prefer to avoid.

Additional limitations involved with shower caddies include the fact that currently available shower caddies are at a fixed height; that is, users who may be limited by how high they can reach, such as small children, the elderly, and/or those with disabilities and/or injuries, may not be able to reach conventional shower caddies which are typically mounted on a showerhead pipe with no lengthening or other height-adjustable capabilities. In some instances, upon trying to reach shower caddies that are too high, these types of users may injure themselves unnecessarily.

Given the foregoing, what is needed are organizational apparatus which facilitate the ability to adjust the length and/or size of the frame of a particular apparatus, such as a shower caddy, as well as adjust, add, and/or remove at least one receptacle element associated with the apparatus, such as a shelf or hook. Organizational apparatus that can easily be repaired by replacing parts when broken are also desirable.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing apparatus which facilitate the ability of a user to customize and/or repair a configuration of an organizational system comprising one or more receptacle elements, such as shelves or hooks. Specifically, in an aspect, apparatus are disclosed wherein a configuration of one or more shelves, hooks, or similar receptacle elements, such as those used with a shower caddy, comprises at least one modular component that allows the size of a frame housing the receptacle elements to be adjusted and/or have a broken portion thereof replaced. Additionally, at least one modular component may facilitate adjustment and/or replacement of a variety of other portions of the organizational system, including the receptacle elements themselves.

In an aspect, an organizational apparatus in accordance with the present disclosure comprises a frame and at least one receptacle element, such as a shelf or hook.

The size of the apparatus's frame may be adjustable via insertion or removal of at least one modular frame extension segment portion. One or more distal ends of at least one modular frame extension segment portion may comprise connectors that may removably attach to corresponding connectors integrated with the frame body or with other modular components, such as one or more various receptacle elements. Such connectors may comprise, by way of example, corresponding interlocking wedges and apertures, nodules and notches, teeth and nooks, ridges and crevices, or other removably interlocking protrusions and recesses. The connectors may be removably attachable or without the use of tools, however, a user may choose to use tools.

One or more receptacle elements associated with the frame may also comprise one or more of the above described connectors for removably attaching to the frame or to other receptacle elements and/or other modular components. In some aspects, a single modular component may comprise a frame portion and at least one receptacle element, such as when one or more shelves, hooks, and/or other receptacle elements are integrated with a frame extension portion.

In an aspect, each removably attachable modular component of the organizational apparatus may be replaced independently, thereby facilitating repair of a broken component without requiring replacement of the entire apparatus.

In some aspects, a portion of the frame of the organizational apparatus, such as the top portion, may be integrated with a securely or removably attached mounting mechanism. Such mounting mechanism may allow the organizational apparatus to be removably mounted in a suspended fashion upon a showerhead pipe, door, wall, or similar location. The mounting mechanism may comprise one or more hooks, clamps, clasps, suction cups, adhesive substances, or similar element(s).

In some aspects, one or more portions of the organizational apparatus of the present disclosure may be produced by an additive manufacturing process, such as that commonly known as "3-D printing." In such aspects, one or more portions of the organizational apparatus may be produced at a user's home or at a facility via an additive manufacturing device.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to apparatus that facilitate the ability of a user to create a customized configuration of an organizational system designed to cater to the user's particular needs. Additionally, apparatus in accordance with the present disclosure may allow individual portions thereof to be interchangeable, thereby allowing a broken portion to be replaced instead of replacing the entire apparatus.

Aspects of the present disclosure provide apparatus which facilitate a user's ability to add, remove, and/or replace one or more frame extension segments and/or receptacle elements used therewith, such as shelves, hooks, and the like. To accomplish this, organizational apparatus in accordance with the present disclosure may comprise at least one modular component that may be used to add, remove, and/or replace various elements associated with the apparatus.

The term "receptacle element" and/or the plural form of this term are used throughout herein to refer to any element capable of receiving one or more items, including personal care items, tools, decorations, and the like.

The terms "module," "modular component," and "modular portion" and/or the plural form of these terms are used throughout herein to refer to any one of a set of standardized parts or independent units that may be added or removed in order to customize or repair one or more organizational apparatus in accordance with the present disclosure. In some aspects, a modular component may comprise a frame extension segment, a receptacle element, or the like.

The term "hook" and/or the plural form of this term is used throughout herein to refer collectively to any receptacle element capable of removably receiving an item in a hanging fashion, including hooks, clips, clasps, clamps, and the like.

Figure 1:
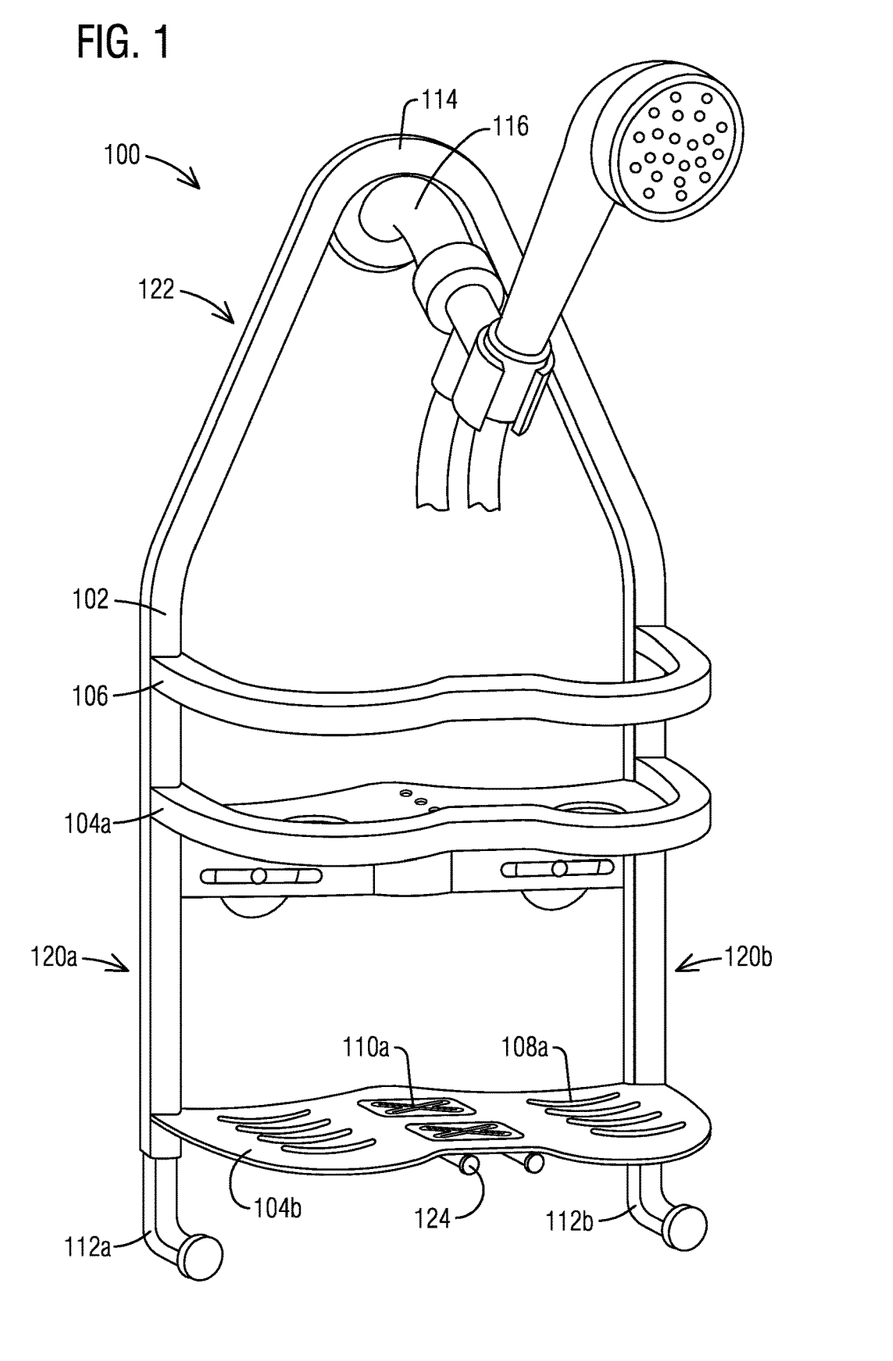
FIG. 1 is a perspective view of a modular suspendable organizational apparatus hanging from a showerhead pipe, according to an aspect of the present disclosure.

Referring now to FIG. 1, a perspective view of a modular suspendable organizational apparatus 100 hanging from a showerhead pipe 116, according to an aspect of the present disclosure, is shown.

In an aspect, apparatus 100 may comprise a frame 102 and at least one receptacle element, such as a shelf 104 (shown as shelves 104a-b in FIG. 1) or a hook 112 (shown as hooks 112a-b in FIG. 1), either of which may comprise a modular form. Frame 102, shelves 104, and/or hooks 112 may comprise any appropriate rigid and/or semi-rigid material(s) as recognized by those skilled in the relevant art(s), including but not limited to metal and various polymers, such as plastics. Each shelf 104 may be securely or removably attached to frame 102, or may be formed as a portion thereof. In some aspects, shelves 104 may be moveably secured to frame 102 via sliding and/or rotational motion. Shelves 104 may be configured to hold liquid containers such as shampoo or conditioner bottles. Shelves 104, such as shelf 104b, may be configured to hold loofas, razors, soap, or the like.

In some aspects, frame 102 may comprise substantially parallel vertical members 120 (labeled as vertical members 120a-b in FIG. 1) that are interconnected near their top portions by an interconnecting transverse member 122. Each shelf 104 integrated with apparatus 100 may traverse the distance between vertical members 120 and be securely or removably attached at opposing distal ends to such vertical members 120.

In some aspects, one or more shelves 104 integrated with apparatus 100 may be integrated with a corresponding retention bar 106 configured to prevent items received upon shelves 104 from being displaced therefrom. Retention bar 106 may comprise one or more materials substantially similar to those used for frame 102 and/or shelves 104.

In some additional aspects, one or more shelves 104 may be integrated with one or more gripping elements 108 (labeled only as gripping element 108a in FIG. 1, for clarity). Gripping elements 108 may prevent items from slipping and/or sliding relative to the surface of a given shelf 104, particularly when such items and/or shelf 104 are wet. Gripping elements 108 may comprise any appropriate material and configuration that serves to increase the coefficient of friction of shelf 104, as will be recognized by those skilled in the relevant art(s) after reading the description herein. By way of example and not limitation, gripping elements 108 may comprise alternating elongated strips of rubber, foam, plastic, or similar material traversing the surface of shelf 104 and securely attached thereto.

In still some additional aspects, one or more shelves 104 may be integrated with at least one slot 110 (labeled only as slot 110a in FIG. 1, for clarity). By way of example and not limitation, in some aspects each slot 110 may comprise a hole within a portion of a given shelf 104 in which one or more items may be removably received. In some additional aspects, one or more slots 110 may comprise a piece of rubber or similarly flexible material with at least one slit therein so as to more securely receive one or more items therein in a removable fashion by forming a tight grip therewith. In aspects wherein apparatus 100 is used as a shower caddy, slot 110 may be configured to removably receive one or more various types of personal care items, including razors, toothbrushes, hairbrushes, and the like. Shelf 104b may further include one or more hooks 124 protruding from shelf 104b. Hooks 124 may be used to hold personal care items such as loofas, wash cloths, and other items apparent to one skilled in the relevant art(s) after reading the description herein.

Shelves 104 may comprise any appropriate shape and/or configuration as will be appreciated by those skilled in the relevant art(s) after reading the description herein. By way of example and not limitation, shelves 104 may be substantially flat and rigid planar components. In some aspects, shelves 104 may be configured in an extra-large or extra-small size so as to receive a wide range of items of various sizes. In some additional aspects, one or more portions of a given shelf 104 may be configured in a shape as will be appreciated by those skilled in the relevant art(s) after reading the description herein so as to removably receive the top portion of a container, so as to allow the container to be received by shelf 104 in an inverted fashion, thereby allowing for easy access to the contents of such container on demand in instances wherein the top portion of the container comprises the container opening. This may save time when the contents of the container are slow-moving when compared with tipping the container over when needed and waiting for the contents to slide to the top portion (i.e., opening). Shelves 104 may include netting portions.

In yet some further aspects, hooks 112 may be securely or removably received at one or more lower distal ends of frame 102. In aspects wherein apparatus 100 is a shower caddy, hooks 112 may be configured to removably receive one or more washcloths, loofahs, poufs, sponges, and the like.

In still some additional aspects, apparatus 100 may be configured with at least one means for being removably or securely mounted in a suspended fashion. In some aspects, this may be accomplished, for example, by integrating a curved portion 114 with the top portion of frame 102 to removably attach apparatus 100 to showerhead pipe 116, such as when apparatus 100 is used as a shower caddy. In some alternative aspects, the top portion of apparatus 100 may be integrated with one or more hooks, clips, clasps, brackets, or similar elements capable of removably or securely mounting apparatus 100 upon a door, wall, or similar elevated structure. Additionally, apparatus 100 may be integrated with one or more adhesion elements 118 (labeled only as adhesion element 118a in FIG. 1, for clarity) in order to stabilize apparatus 100 and help maintain its position upon a vertically-oriented or inclined surface while preventing unwanted lateral movement. Adhesion elements 118 may comprise suction cups, hook and loop fasteners, one or more adhesive materials, or any similar appropriate element(s) as may be apparent to those skilled in the relevant art(s) after reading the description herein. Adhesion elements 118 may be mounted within a lateral channel, allowing the lateral position of adhesion element 118 to be adjusted as needed. Additionally, hook 112 may include a protrusion extending toward the shower wall or the like and contact the wall for stability.

Figure 2:
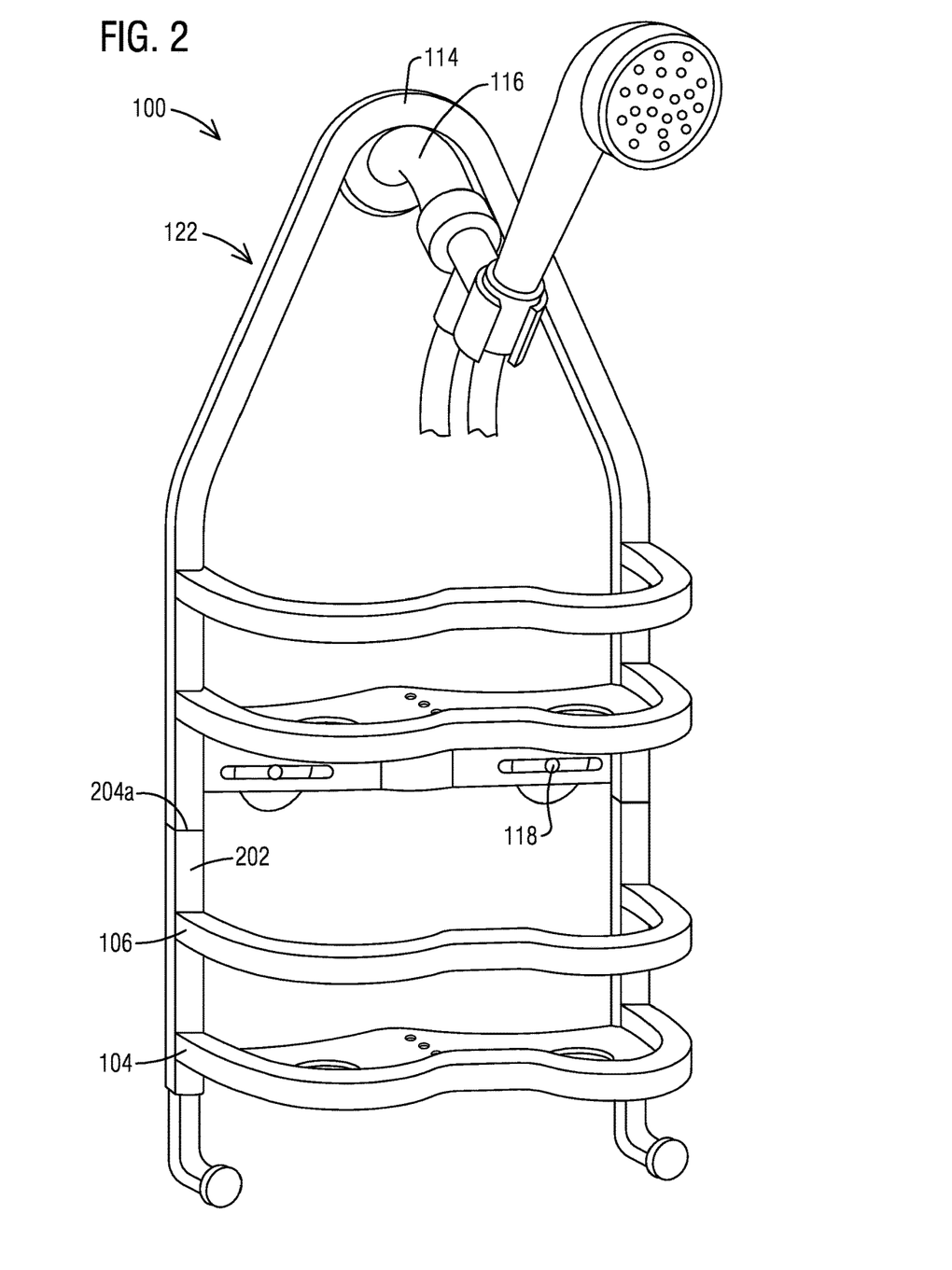
FIG. 2 is a perspective view of a modular suspendable organizational apparatus with an attached extension portion, the apparatus hanging from a showerhead pipe, according to an aspect of the present disclosure.

Referring now to FIG. 2, a perspective view of modular suspendable organizational apparatus 100 with an attached extension portion 202, apparatus 100 hanging from showerhead pipe 116, according to an aspect of the present disclosure, is shown.

In some aspects, apparatus 100 may be configured to removably receive a module in the form of extension portion 202. Extension portion 202 may connect to apparatus 100 at one or more connection locations 204 (shown only as connection location 204a in FIG. 2, for clarity). Extension portion 202 may comprise one or materials substantially similar to those used for frame 102 and/or shelves 104. In some aspects, extension portion 202 may comprise one or more of its own shelves 104 and/or other receptacle elements and, optionally, one or more of its own retention bars 106.

Figure 3:
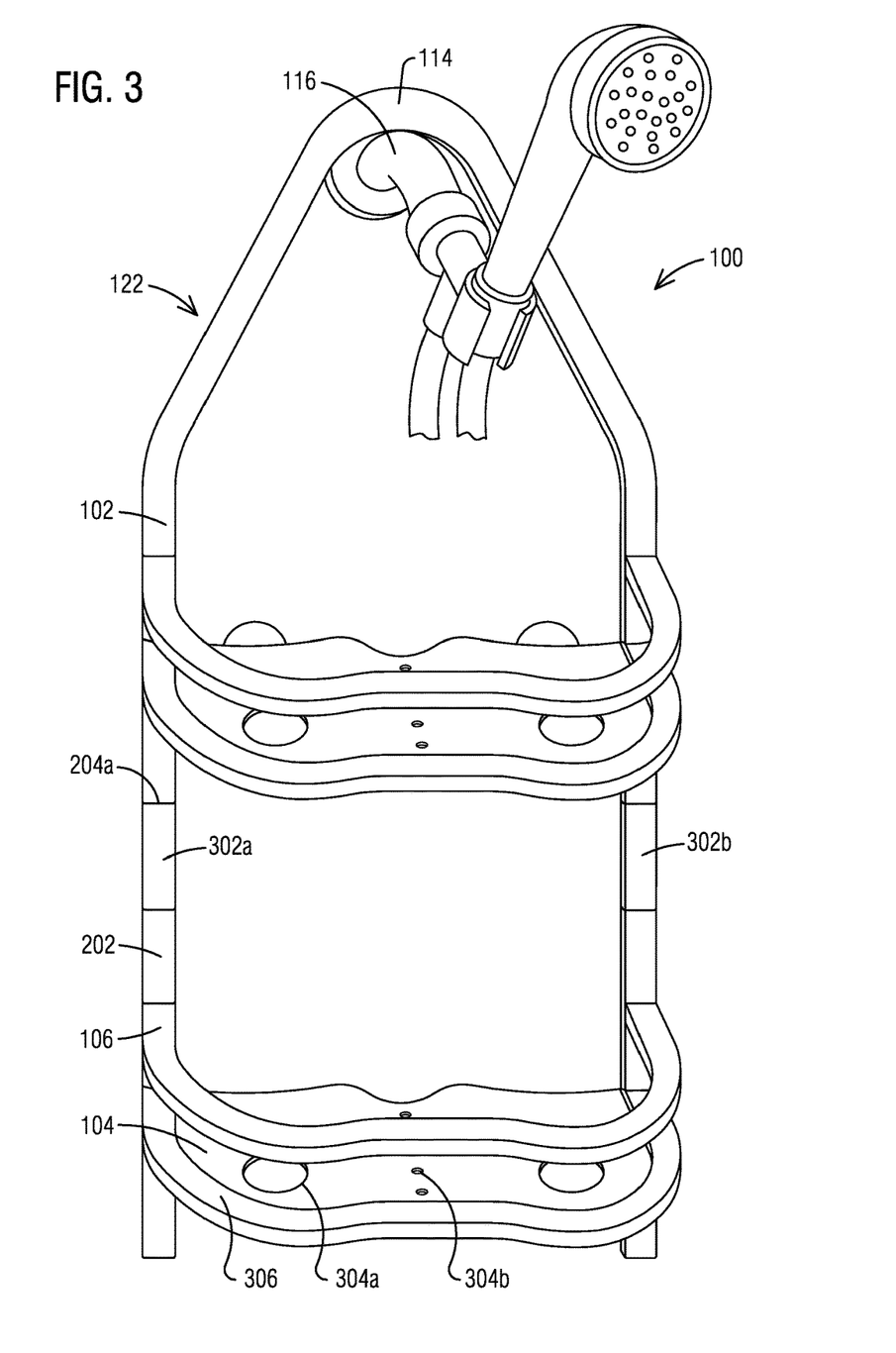
FIG. 3 is a front view of a modular suspendable organizational apparatus utilizing a pair of frame extension segments and an attached extension portion, the apparatus hanging from a showerhead pipe, according to an aspect of the present disclosure.

Referring now to FIG. 3, a front view of modular suspendable organizational apparatus 100 utilizing a pair of frame extension segments 302, apparatus 100 hanging from showerhead pipe 116, according to an aspect of the present disclosure, is shown.

In some aspects, apparatus 100 may be used with additional modules in the form of one or more frame extension segments 302 (shown as frame extension segments 302a-b in FIG. 3). Frame extension segments 302 may attach to frame 102, and/or one or more various other modules, including additional frame extension segments 302, at one or more connection locations 204 (labeled only as connection location 204a in FIG. 3, for clarity). In some aspects, frame extension segments 302 may be elongated portions similar in width, shape, thickness, and material composition to frame 102 or one or more portions thereof; however, any appropriate configuration of frame extension segments 302 may be used as will be appreciated by those skilled in the relevant art(s) after reading the description herein. By way of example and not limitation, frame extension segments 302 may be 5.08 cm, 10.16 cm, 15.24 cm, 20.32 cm, or any other appropriate length as will be appreciated by those skilled in the relevant art(s) after reading the description herein. Frame extension segments 302 may be added and/or removed to/from frame 102 to increase and/or decrease its length, which may also serve, in some aspects, to adjust the distance between shelves 104 and/or other modules as well as serve to place one or more of the modules within the reach of users who may have limits on how high they can reach, such as small children, the elderly, and those with disabilities and/or injuries. Multiple frame extension segments 302 may be used consecutively.

In some additional aspects, one or more shelves 104 may be integrated with one or more holes 304 (labeled only as holes 304a-b in FIG. 3, for clarity) of varying sizes. Holes 304 may be used for letting water or other liquids and/or small solids pass through a given shelf 104, especially in aspects where apparatus 100 is used as a shower caddy. In yet some further aspects, one or more shelves 104 may comprise a raised lip 306 for helping to retain items upon the surface of a given shelf 104.

Figure 4:
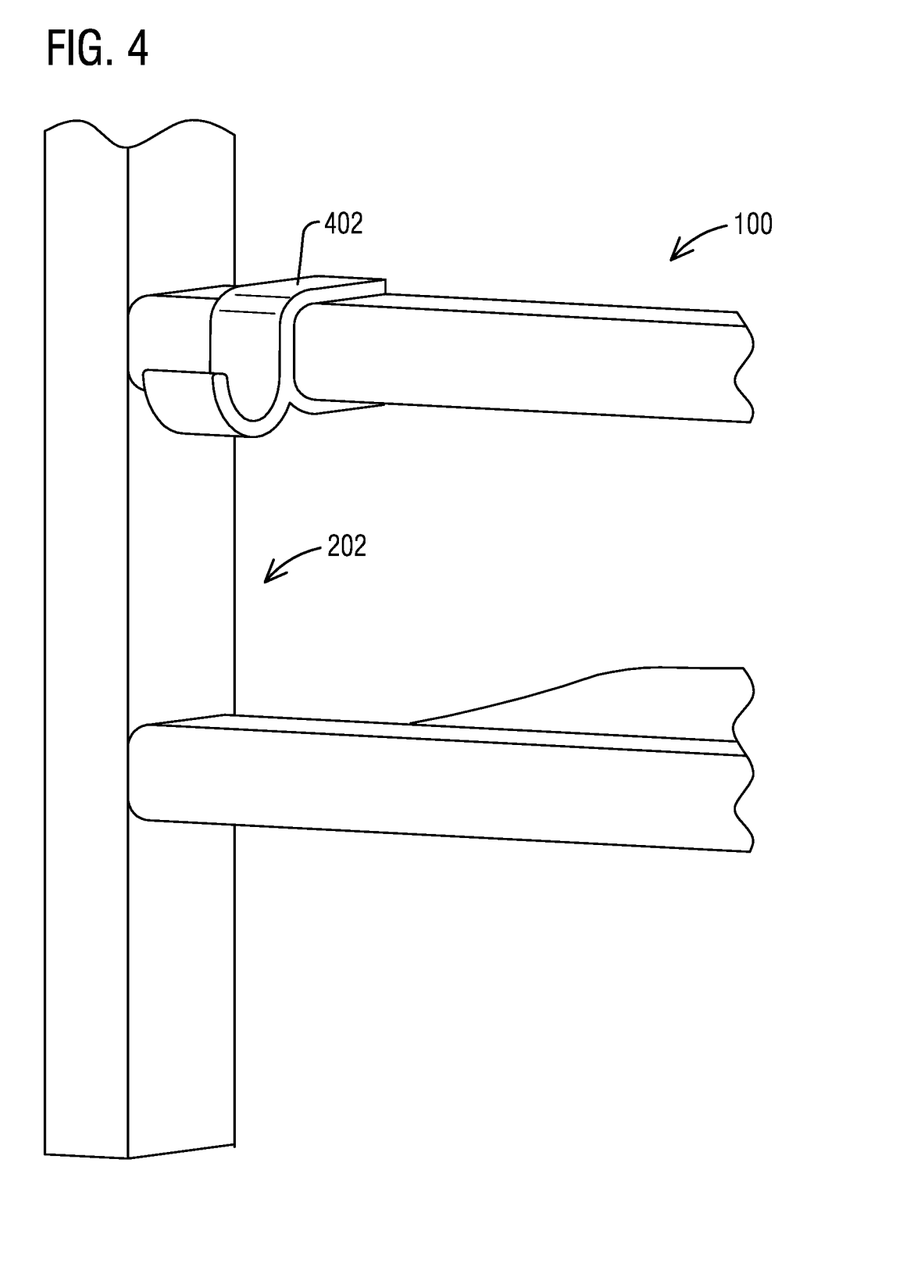
FIG. 4 is a side view of an extension portion for a modular suspendable organizational apparatus, according to an aspect of the present disclosure.

Referring now to FIG. 4, a side view of extension portion 202 for modular suspendable organizational apparatus 100, according to an aspect of the present disclosure, is shown.

In some aspects, various portions of apparatus 100, such as extension portion 202, may be configured to removably or securely receive one or more modules in the form of a hanger element 402. In some aspects, hanger element 402, as well as other modules associated with apparatus 100, may attach to apparatus 100 via a clip, clasp, or similar mechanism such as, by way of example and not limitation, clasp 504 (not shown in FIG. 4, but shown in FIG. 5 labeled only as clasp 504a, for clarity). Additionally, hanger element 402 may be slidable and/or rotatable upon apparatus 100 and may be used to removably receive a variety of items. By way of example and not limitation, in aspects wherein apparatus 100 is used as a shower caddy, hanger element 402 may receive one or more washcloths, loofahs, poufs, sponges, mirrors, shower radios, and similar items.

Figure 5:
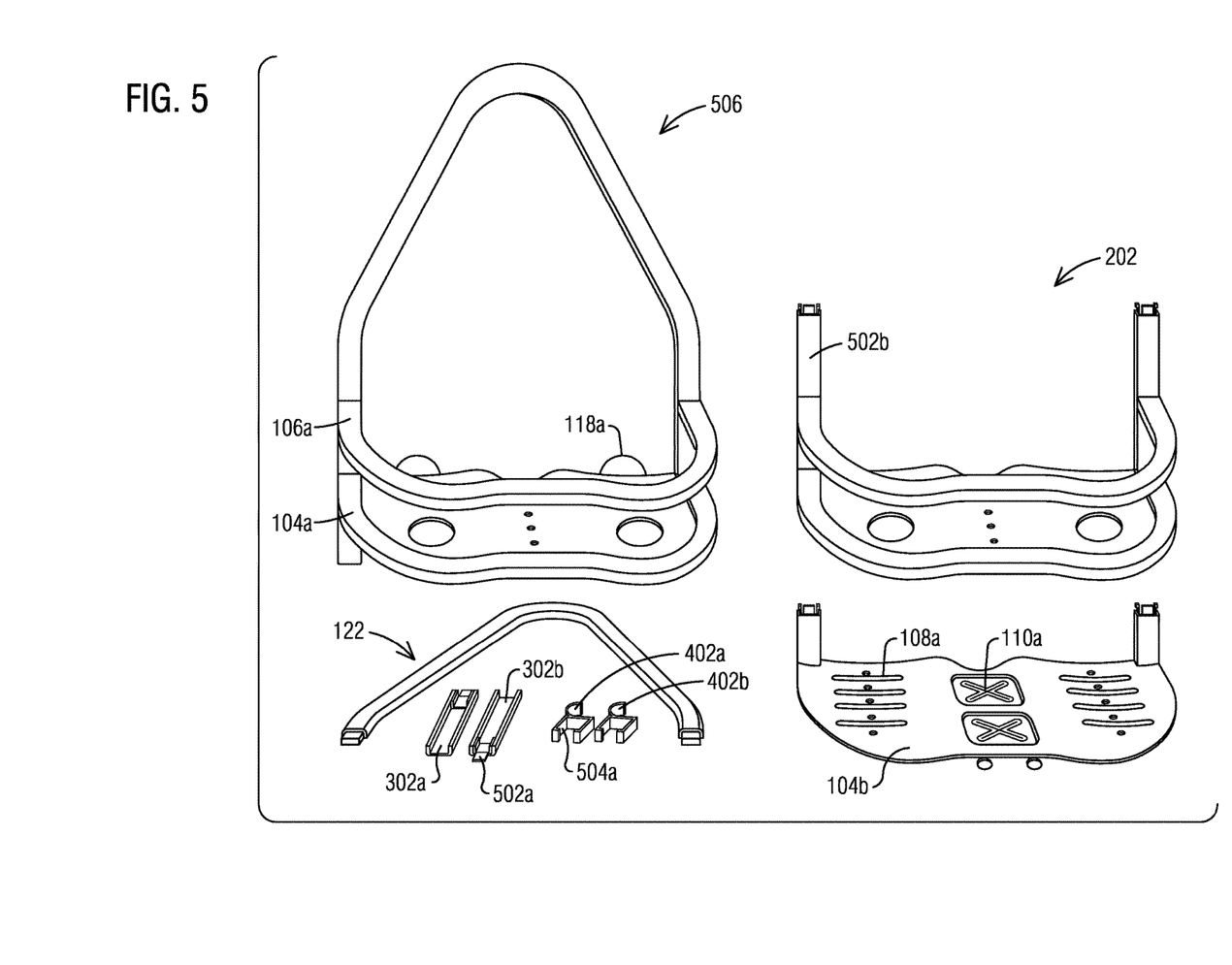
FIG. 5 is a perspective view of various modules useable with a modular suspendable organizational apparatus, according to an aspect of the present disclosure.

Referring now to FIG. 5, a perspective view of various modules useable with modular suspendable organizational apparatus 100, according to an aspect of the present disclosure, is shown.

Modules that may be used with apparatus 100 may comprise any of the elements of apparatus 100, including, but not limited to, an upper portion 506, including its own shelf 104 (labeled as shelf 104a in FIG. 5), its own retention bar 106 (labeled as retention bar 106a in FIG. 5), and/or its own adhesion element 118 (labeled as adhesion element 118a in FIG. 5); extension portion 202; frame extension segments 302 (shown as frame extension segments 302a-b in FIG. 5); hanger elements 402 (shown as hanger elements 402a-b in FIG. 5); transverse member 122; and an individual shelf 104 (labeled as shelf 104b in FIG. 5), such individual shelf 104 optionally including one or more gripping elements 108 (labeled only as gripping element 108a in FIG. 5, for clarity) as well as one or more slots 110 (labeled only as slot 110a in FIG. 5, for clarity). Additionally individual hooks 112 may take the form of modules. Other modules may include, without limitation, bags, sacks, buckets, cups, hanging bars, as well as others that may be apparent to those skilled in the relevant art(s) after reading the description herein, any of which may comprise rigid, semi-rigid, and/or soft materials, as well as other materials as may be deemed appropriate. Each module may be attached to another module and/or all or part of frame 102 with or without the use of tools via one or more connectors 502 (labeled only as connectors 502a-b in FIG. 5, for clarity). In some aspects, connectors 502 may be configured at one or more end portions associated with the various modules and/or frame 102 or portions thereof, or at any other appropriate location as may be apparent to those skilled in the relevant art(s) after reading the description herein. Connectors 502 may be configured in a variety of different forms, some of which will be detailed below. In some aspects, there is essentially no limit to the number of modules that may be used with a single apparatus 100 or the order in which they may be connected.

Shelf 104 may also include one or more hooks 112 for hanging personal care items such as loofahs, poufs, sponges, washcloths and the like.

In some aspects, any of the various types of modules, as well as frame 102, may be produced using one or more additive manufacturing processes and their associated devices, thereby allowing a user to produce portions of, as well as entire copies of, apparatus 100 as needed.

Figure 6:
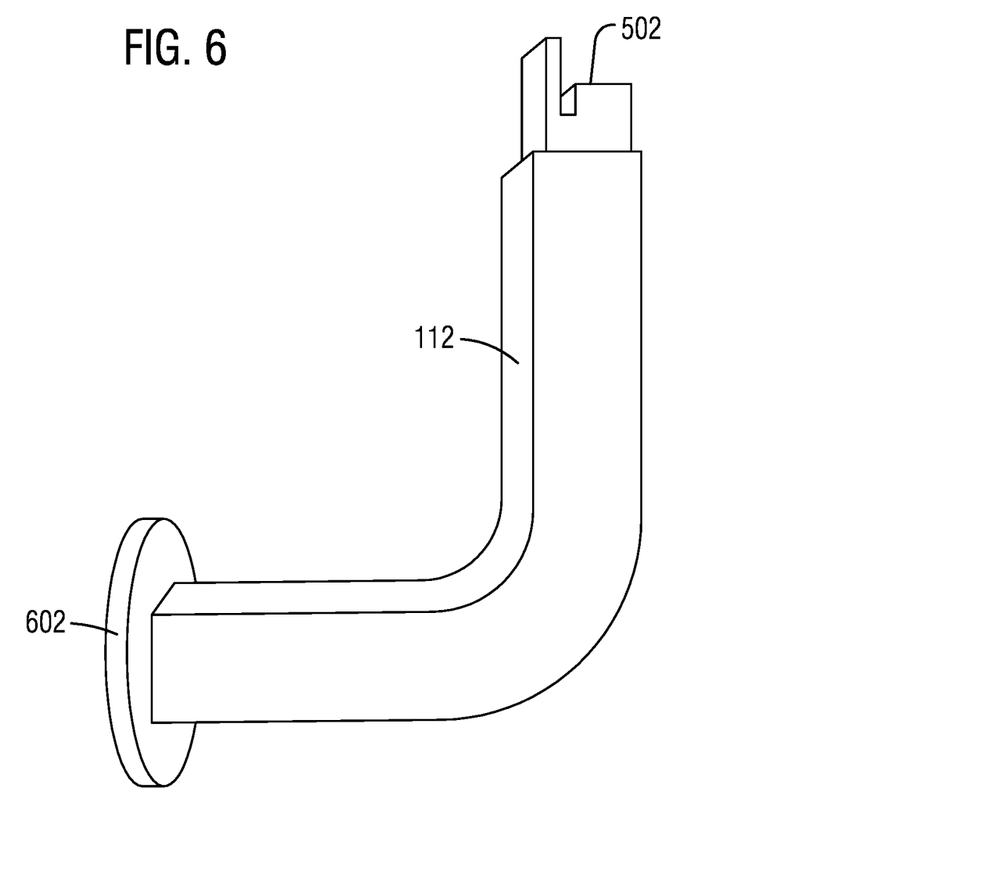
FIG. 6 is a side view of a module in the form of a hook useable with a modular suspendable organizational apparatus, according to an aspect of the present disclosure.

Referring now to FIG. 6, a side view of a module in the form of hook 112 useable with modular suspendable organizational apparatus 100, according to an aspect of the present disclosure, is shown.

In some aspects, hook 112 may removably attach to apparatus 100 via connector 502 at a first end portion. A second end portion of hook 112 may, in some aspects, comprise a knob 602. Knob 602 may prevent items received by hook 112 from sliding or falling off unintentionally. In some additional aspects, hook 112 may include one or more stability segments that contacts either apparatus 100 or a surface apparatus 100 is mounted on in order to provide additional support for hook 112 and apparatus 100. In such aspects, a distal end of such stability segment may be integrated with an adhesion element 118.

Figure 7:
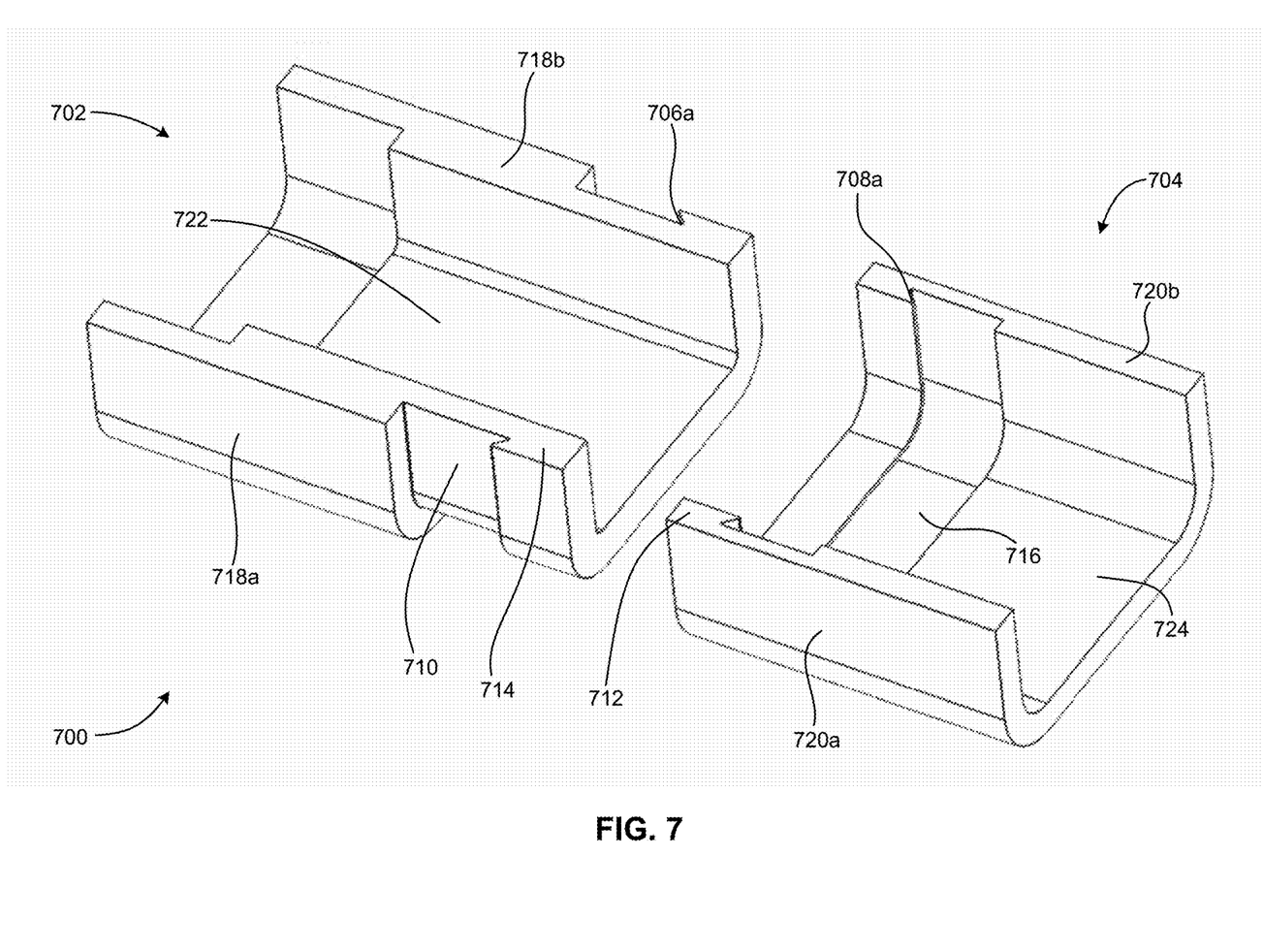
FIG. 7 is a perspective view of an exemplary connector useable with a modular suspendable organizational apparatus, the connector in the disconnected state, according to an aspect of the present disclosure.

Referring now to FIG. 7, a perspective view of an exemplary connector 700 useable with modular suspendable organizational apparatus 100, connector 700 in the disconnected state, according to an aspect of the present disclosure, is shown.

In some aspects, connector 502 may be configured as connector 700.

Connector 700 may comprise a first connector portion 702 and a second connector portion 704. First and second connector portions 702 and 704 may be securely integrated with corresponding distal ends of two modules or a module and a portion of frame 102, depending on what elements a user desires to attach together. In some aspects, connector portions 702 and 704 may each comprise a rectangular parallelepiped with an open bottom side and an open distal end; however, any appropriate shape and configuration may be used as will be appreciated by those skilled in the relevant art(s) after reading the description herein. Additionally, first and second connector portions 702 and 704 may be connected to and disconnected from each other without the use of tools and may be configured so as to engage in little to no lateral movement relative to each other.

In an aspect, first connector portion 702 may comprise an indentation 710 which further comprises one or more recesses 706 (labeled only as recess 706a in FIG. 7, for clarity). Indentation 710 may be configured to receive lip 712 at the distal end of second connector portion 704 after lip 712 has slid past lip 714 at the distal end of first connector portion 702. Once lip 712 has been received by indentation 710, second connector portion 704 may be moved away from first connector portion 702 until one or more protrusions 708 (labeled only as protrusion 708a in FIG. 7, for clarity) is removably received by corresponding recess(es) 706. Upon being so received, lip 714 may be contained within an indentation 716 of second connector portion 704. In aspects wherein first and second connector portions 702 and 704 comprise three sides, indentation 710 and lip 712 may span all three sides of first and second connector portions 702 and 704, respectively.

In order to connect and disconnect second connector portion 704 to/from first connector portion 702, sidewalls 718 (labeled as sidewalls 718*a-b* in FIG. 7) of first connector portion 702 and/or sidewalls 720 (labeled as sidewalls 720*a-b* in FIG. 7) may comprise appropriate materials as will be appreciated by those skilled in the relevant art(s) after reading the description herein so as to be sufficiently pliable so as to move toward or away from each other as needed without breaking, thereby allowing lip 712 to be removed from/received by indentation 710 as required. Additionally, sidewalls 718 and 720 may comprise tension forces that are biased so as to return sidewalls 718 and 720 to a position perpendicular to substantially flat, planar surfaces 722 and 724 associated with first connector portion 702 and second connector portion 704, respectively, thereby helping lip 712 fit tightly within indentation 710 upon clearing lip 714. Appropriate materials for sidewalls 718 and/or 720 may include metals and/or polymers, such as plastic, as well as other materials as may be apparent to those skilled in the relevant art(s) after reading the description herein, or any combination thereof. Such materials may also be appropriate for connector 700, generally, either in a rigid or semi-rigid configuration.

Figure 8:
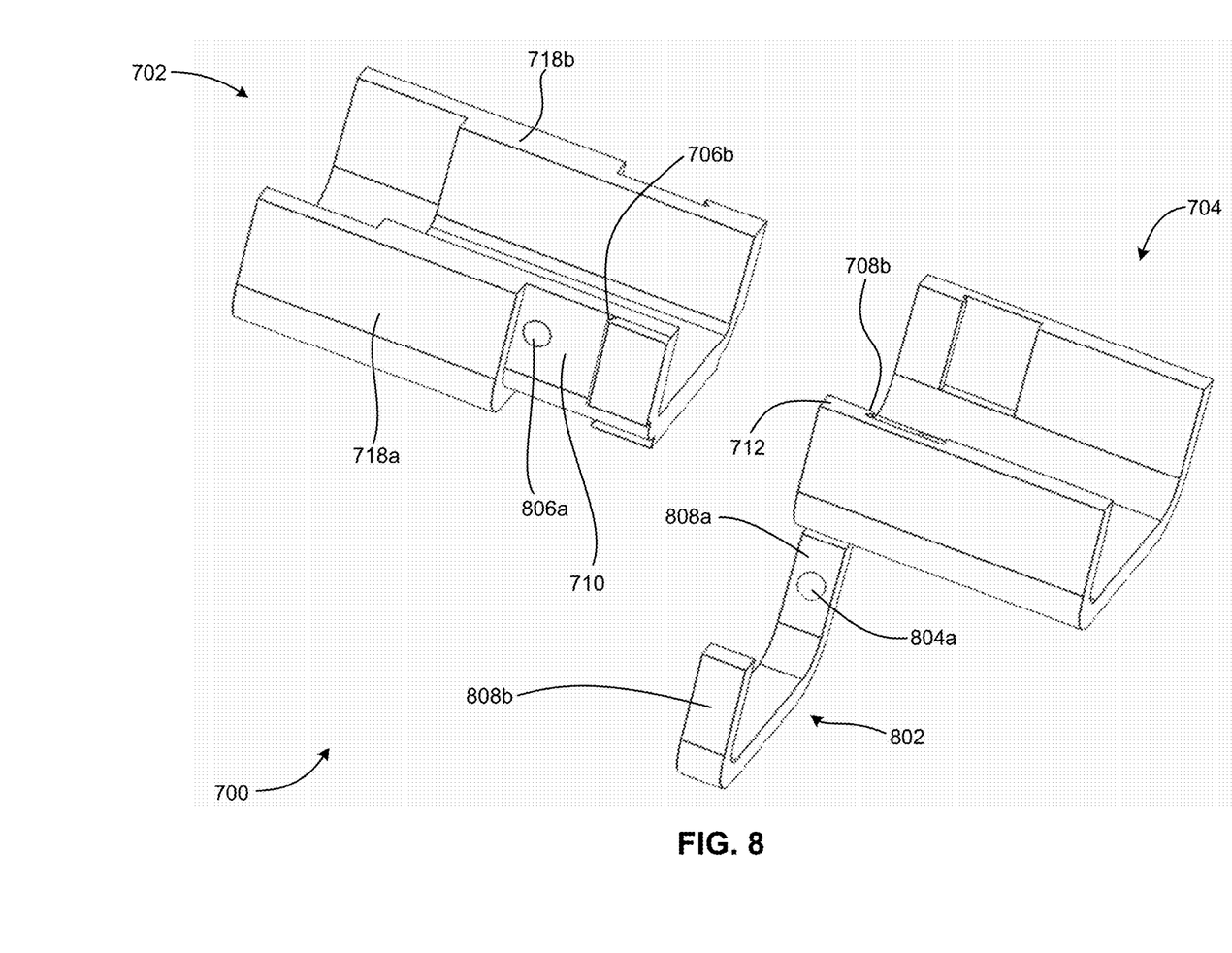
FIG. 8 is a perspective view of an exemplary connector configured with a locking band useable with a modular suspendable organizational apparatus, the connector in the disconnected state, according to an aspect of the present disclosure.
Figure 9:
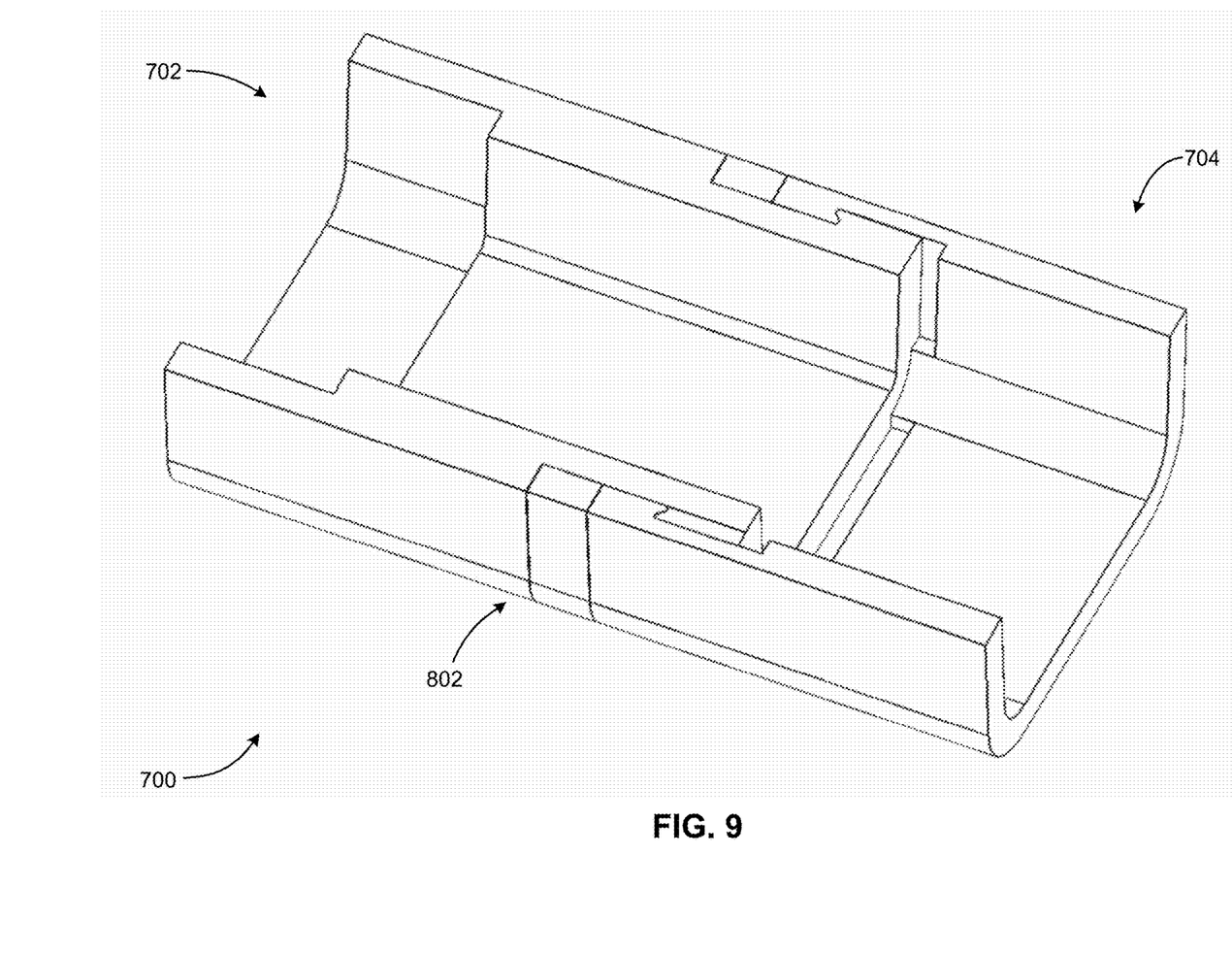
FIG. 9 is a perspective view of an exemplary connector configured with a locking band useable with a modular suspendable organizational apparatus, the connector in the connected state, according to an aspect of the present disclosure.

Referring now to FIGS. 8 & 9, views of exemplary connector 700 configured with a locking band 802 useable with modular suspendable organizational apparatus 100, connector 700 in the disconnected and connected state, according to an aspect of the present disclosure, are shown.

In some aspects, connector 700 may be used with at least one locking band 802. Locking band 802 may serve to fill in the extra space within indentation 710 when lip 712 is received therein and protrusions 708 (labeled only as protrusion 708*b* in FIG. 8, for clarity) are removably secured within recesses 706 (labeled only as recess 706*b* in FIG. 8, for clarity). In some aspects, locking band 802 may span as many sides of first connector portion 702 as indentation 710.

In some aspects, in order to keep locking band 802 in place, one or more inner portions of locking band 802 may comprise one or more nodules 804 (shown only as nodule 804*a* in FIG. 8) that may be removably secured within corresponding one or more notches 806 (shown only as notch 806*a* in FIG. 8) within indentation 710. In some aspects, nodules 804 may be comprised within the inner portion of one or both legs 808 (labeled as legs 808*a-b* in FIG. 8) of locking band 802 and corresponding notches 806 may be located within portions of indentation 710 associated with sidewalls 718 (labeled as sidewalls 718*a-b* in FIG. 8).

As will be appreciated by those skilled in the relevant art(s) after reading the description herein, nodules 804 and notches 806 may comprise other appropriate structures and/or configurations, including, by way of example and not limitation, placing nodules 804 within indentation 710 and placing notches 806 along the inner portion of locking band 802.

Figure 10:
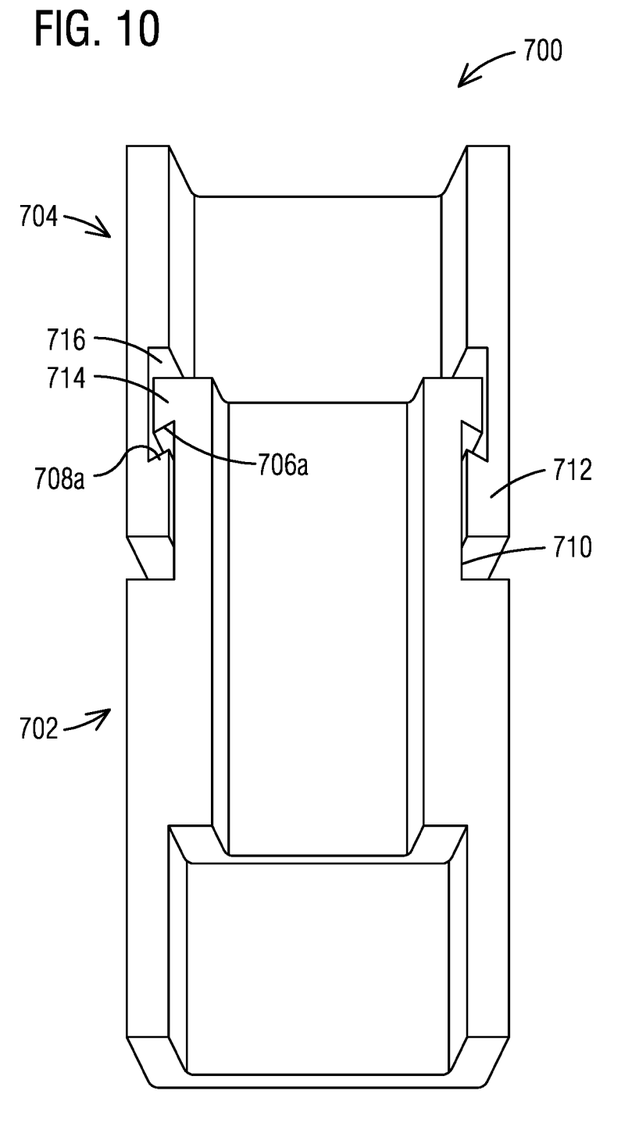
FIG. 10 is a front view of an exemplary connector useable with a modular suspendable organizational apparatus, the connector in an intermediate state, according to an aspect of the present disclosure.

Referring briefly to FIG. 10, a front view of exemplary connector 700 useable with modular suspendable organizational apparatus 100, connector 700 in an intermediate state, according to an aspect of the present disclosure, is shown. Lips 712 and 714 have been received by indentations 710 and 716, respectively; however, protrusions 708 (labeled only as protrusion 708*a* in FIG. 10, for clarity) have not yet been received by recesses 706 (labeled only as recess 706*a* in FIG. 10, for clarity).

Figure 11:
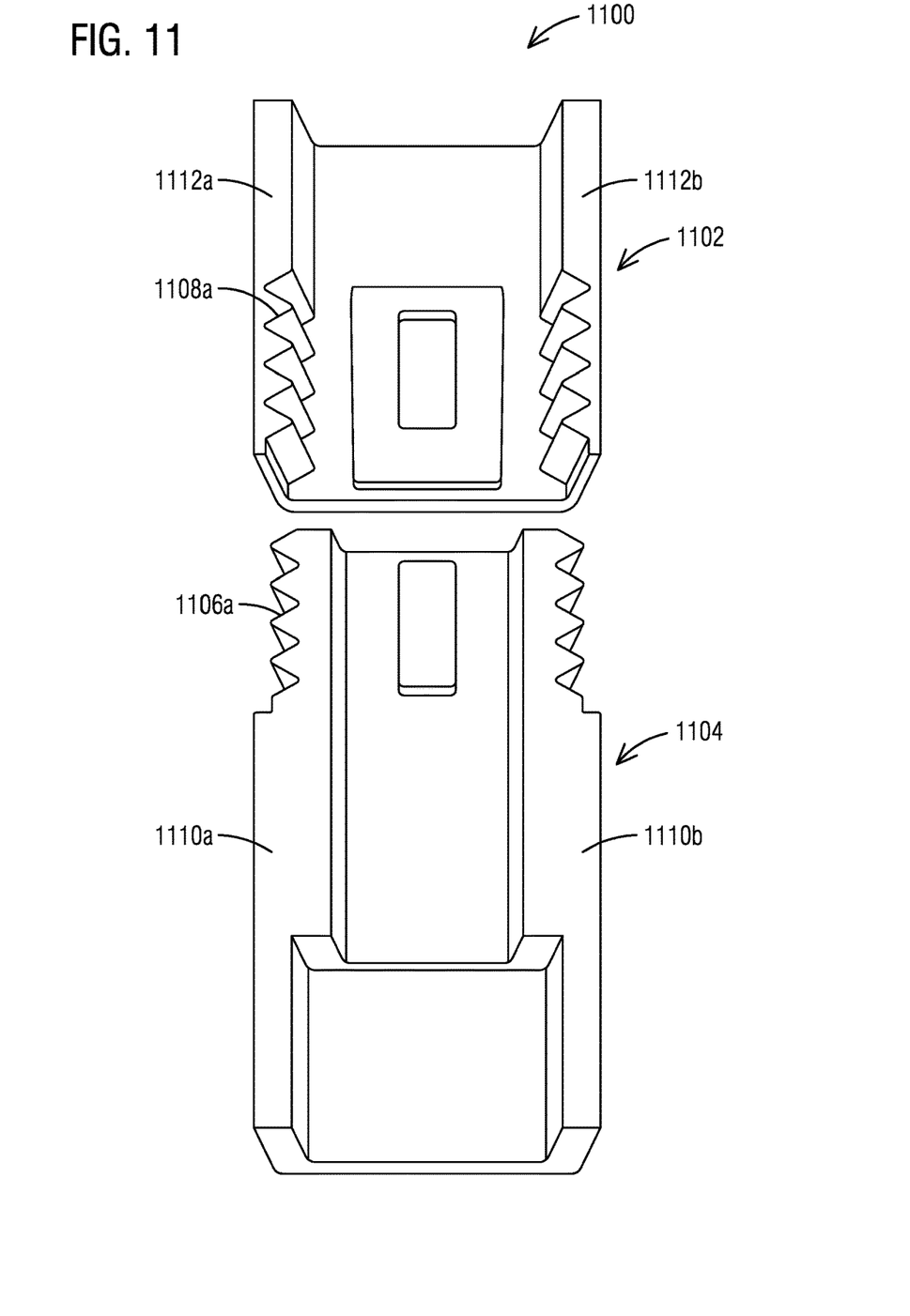
FIG. 11 is a front view of a second exemplary connector useable with a modular suspendable organizational apparatus, the connector in the disconnected state, according to an aspect of the present disclosure.

Referring now to FIG. 11, a front view of a second exemplary connector 1100 useable with modular suspendable organizational apparatus 100, connector 1100 in the disconnected state, according to an aspect of the present disclosure, is shown.

In some aspects, connector 502 may be configured as connector 1100.

Connector 1100 includes a series of teeth 1106 (labeled only as tooth 1106*a* in FIG. 11, for clarity) integrated within sidewalls 1110 (labeled as sidewalls 1110*a-b* in FIG. 11) of second connector portion 1104. Teeth 1106 may be configured to be removably secured within a corresponding series of one or more nooks 1108 (labeled only as nook 1108*a* in FIG. 11, for clarity) contained within sidewalls 1112 (labeled as sidewalls 1112*a-b* in FIG. 11) of first connector portion 1102.

In an aspect, connector 1100 may comprise one or more rigid and/or semi-rigid materials, including but not limited to metals, plastics and other polymers. Sidewalls 1110 may be configured of such appropriate materials so as to be sufficiently pliable in order to allow a user to squeeze them together with or without the use of tools to connect or disconnect second connector portion 1104 from first connector portion 1102. As will be appreciated by those skilled in the relevant art(s) after reading the description herein, in some aspects, teeth 1106 and nooks 1108 may be configured in an angled fashion to allow second connector portion 1204 to be slidably movable in one direction so as to be received by first connector portion 1102 without having to squeeze sidewalls 1110.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices and environments other than those mentioned herein). As will be appreciated by those skilled in the relevant art(s) after reading the description herein, certain features from different aspects of the apparatus of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A modular suspendable organizational apparatus, comprising:
   a frame; and
   at least one removably attachable modular component comprising an end portion that comprises a connector, wherein the connector comprises:
   a first connector portion comprising at least one substantially flat planar surface securely attached to two substantially parallel sidewalls oriented perpendicularly thereto, the first connector portion further comprising an indentation and a distal end integrated with a lip; and a second connector portion comprising at least one substantially flat planar surface securely attached to two substantially parallel sidewalls oriented perpendicularly thereto, the second connector portion further comprising an indentation configured to removably receive the lip of the first connector portion and a distal end with a lip configured to be removably received by the indentation of the first connector portion;

wherein the sidewalls of the first and second connector portions are at least semi-pliable and comprise a tension force biased to return the sidewalls to a position substantially perpendicular to each of the at least one planar surfaces of the first and second connector portions upon deviation from such position;

wherein the distal end with the lip of the second connector portion comprises at least one protrusion configured to be removably secured within at least one recess within the indentation of the first connector portion.

2. The apparatus of claim 1, wherein the connector further comprises at least one locking band.

3. The apparatus of claim 2, wherein the at least one locking band is removably secured within the indentation of the first connector portion, the indentation and the locking band spanning the at least one substantially flat planar surface and the two substantially parallel sidewalls of the first connector portion.

4. The apparatus of claim 3, an inner portion of the at least one locking band comprising at least one raised nodule configured to be removably secured within at least one notch within the indentation of the first connector portion.

5. A modular suspendable organizational apparatus, comprising:
a plurality of interchangeable parts;
a connector to interconnect at least two interchangeable parts of the plurality of interchangeable parts, wherein the connector comprises:
a first portion comprising a substantially flat first planar surface, a first left sidewall integrally attached and perpendicular to the first planar surface, and a first right sidewall parallel to the first left sidewall, and integrally attached and perpendicular to the first planar surface, the first portion further comprising a first distal end and a first indentation offset from the first distal end to form a first lip and a first recess, the first lip further comprising a first protrusion extending from the first lip over the first indentation; and
a second portion comprising a substantially flat second planar surface, a second left sidewall integrally attached and perpendicular to the second planar surface, and a second right sidewall parallel to the second left sidewall, and integrally attached and perpendicular to the second planar surface, the second portion further comprising a second distal end and a second indentation offset from the second distal end to form a second lip and a second recess, the second lip further comprising a second protrusion extending from the second lip over the second indentation, the first indentation of the first portion configured to receive the second lip of the second portion and the second indentation of the second portion configured to receive the first lip of the first portion;
wherein the first left sidewall and the first right sidewall of the first portion, and the second left sidewall and the second right sidewall of the second portion comprise a tension force biased to return the sidewalls to a position substantially perpendicular to each of the at least one planar surfaces of the first and second portions upon deviation from such position.

6. The apparatus of claim 5, wherein the first left sidewall and the first right sidewall of the first portion, and the second left sidewall and the second right sidewall of the second portion are at least semi-pliable.

\* \* \* \* \*